United States Patent [19]

Forster

[11] 3,743,928
[45] July 3, 1973

[54] MAGNETIC FLAW DETECTOR SYSTEM FOR RECIPROCATING PAIRS OF LEAKAGE FIELD DETECTORS WITH MEANS FOR ADJUSTING THE SPACING BETWEEN EACH PAIR OF DETECTORS

[76] Inventor: Friedrich M. O. Forster, Grathwohl Strasse 4, D-741 Reutlingen, Germany

[22] Filed: Jan. 12, 1971

[21] Appl. No.: 105,856

[52] U.S. Cl. ................................................. 324/37
[51] Int. Cl. ............................................ G01r 33/12
[58] Field of Search ................................ 324/37, 40

[56] References Cited
UNITED STATES PATENTS

| | | | |
|---|---|---|---|
| 2,602,108 | 7/1952 | Dionne | 324/37 |
| 2,881,387 | 4/1959 | Wood | 324/37 |
| 3,209,243 | 9/1965 | Walten et al. | 324/37 |
| 3,343,079 | 9/1967 | Crouch | 324/37 |
| 3,379,970 | 4/1968 | Kusenberger | 324/37 |
| 3,466,536 | 9/1969 | Arnelo et al. | 324/37 |
| 3,469,182 | 9/1969 | Wycherly et al. | 324/37 |
| 3,504,276 | 3/1970 | Proctor et al. | 324/37 |
| 3,535,624 | 10/1970 | Wood | 324/37 |

Primary Examiner—Robert J. Corcoran
Attorney—George J. Netter and Kendrick, Subkow & Kriegel

[57] ABSTRACT

A non-destructive testing system for detecting longitudinal and transverse defects, simultaneously, in metallic tubes or pipes in which a plurality of essentially punctiform magnetic sensing elements are disposed along a generally straight line adjacent the workpiece surface. A mechanical oscillator reciprocates the sensing elements along a line parallel to that of the sensing elements disposition. Adjacent elements are electrically connected in opposition to form differential probe pairs, the line connecting the adjacent probes to form the differential pairs being inclined at 45 degrees to the line of reciprocation. In addition to providing for the simultaneous detection of longitudinal and transverse defects, the system disclosed can resolve the signals from ID and OD defects to a degree heretofore unobtainable.

8 Claims, 13 Drawing Figures

Patented July 3, 1973

INVENTOR
FRIEDRICH M. O. FÖRSTER
BY
KENDRICK SUBKOW & KRIEGEL

ATTORNEYS

Patented July 3, 1973

INVENTOR
FRIEDRICH M. O. FÖRSTER
BY
KENDRICK SUBKOW & KRIEGEL
George J. Netter
ATTORNEYS Patented July 3, 1973
3,743,928
6 Sheets-Sheet 3
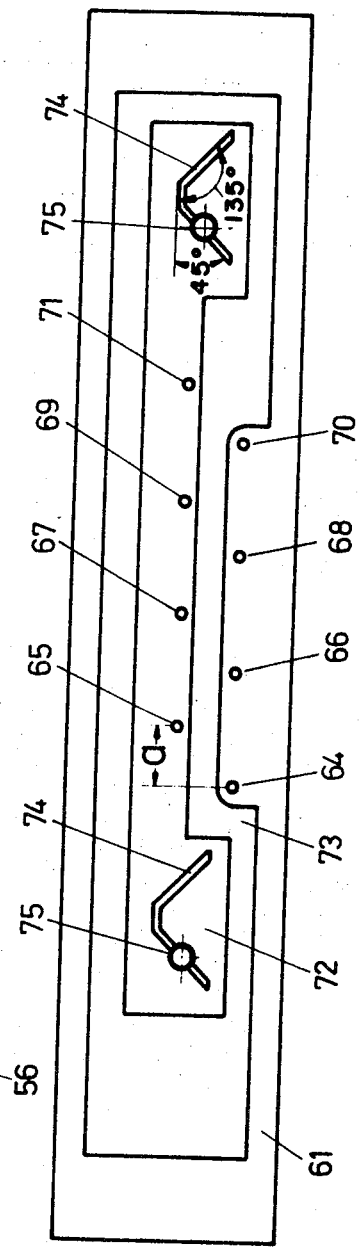
Fig 5
Fig 6
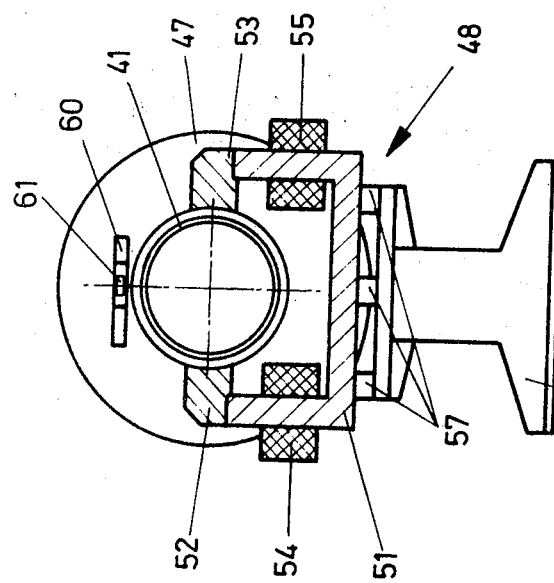
INVENTOR
FRIEDRICH M. O. FÖRSTER
BY
KENDRICK SUBKOW & KRIEGEL
George J. Netter
ATTORNEYS Patented July 3, 1973 3,743,928
6 Sheets-Sheet 4
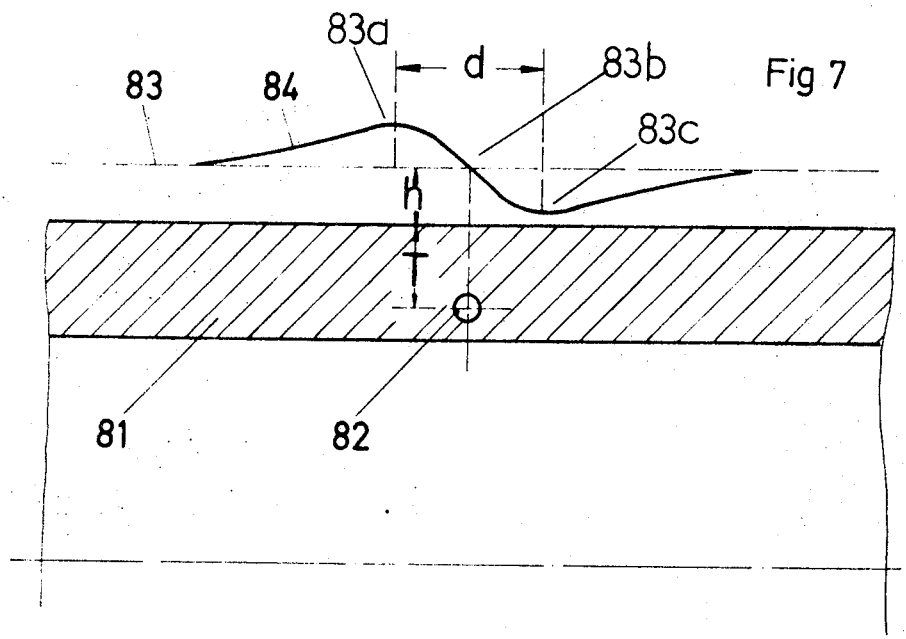
Fig 7
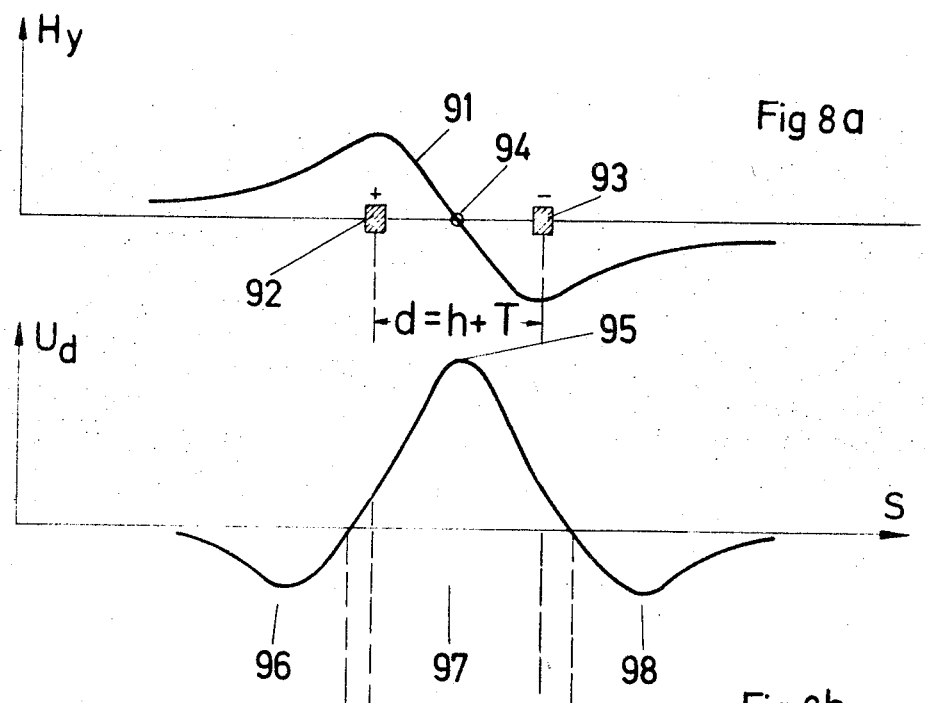
Fig 8a
Fig 8b
INVENTOR
FRIEDRICH M. O. FÖRSTER
BY
KENDRICK SUBKOW & KRIEGEL
George J. Hötter
ATTORNEYS

MAGNETIC FLAW DETECTOR SYSTEM FOR RECIPROCATING PAIRS OF LEAKAGE FIELD DETECTORS WITH MEANS FOR ADJUSTING THE SPACING BETWEEN EACH PAIR OF DETECTORS

BACKGROUND OF THE INVENTION

The present invention relates to a system for non-destructive testing of metallic workpieces, and, more particularly, for the testing of elongated cylindrical members such as tubes or pipes, to detect both longitudinal and transverse defects.

Procedures are known in the prior art for the magnetic non-destructive testing of metallic workpieces. These systems utilize one of two methods of magnetic testing. The first is the so-called eddy current method, in which a high-fruquency alternating magnetic field is used to produce eddy currents in the workpiece surface layer and the characteristics of the eddy currents are related to the physical condition of the workpiece. A sensing element located near the workpiece produces an electric signal responsive to the fields reradiated by these eddy currents.

The second approach is the so-called stray field or leakage flux method, whereby a magnetic field is generated within the workpiece and the field in the adjacent air is monitored. Defects which cut across the lines of flux of the magnetic field will generate so-called stray fields adjacent the surface of the workpiece, and magnetic sensing elements detecting the stray fields produce an electric signal indicating the presence of the defects.

The eddy current method may be used for the testing of any metallic workpiece; however, since the eddy currents only penetrate a very short distance below the surface of the workpiece, it is not useful for testing the entire thickness of a relatively thick workpiece. The stray field method must be used on ferromagnetic workpieces; however, it will detect the presence of a defect located anywhere throughout the entire thickness of the workpiece.

Non-destructive testing systems using both of these methods are also known in the prior art. However, there are many shortcomings associated with the known systems which are overcome by the present invention, one of the more important of these shortcomings being the inability to detect both transversely and longitudinally extending defects. Secondly, those parts of the systems relating to the stray field method frequently utilize elongated sensing coils positioned adjacent the surface of the workpiece, which produce signals that are not proportional to the depth of a defect, whereas standards of the testing art usually require the rejection of a workpiece having a defect with a depth which exceeds certain limits. Moreover, the magnitude of a signal produced by such a search coil depends not only on the size of the defect, but also on the relative speed at which the coil moves over the surface and the direction of the defect. Still further, when testing elongated cylindrical workpieces such as pipes, a separate coil must be provided for each pipe diameter, since the curvature of the coils must match the curvations of the pipes exactly. Also, known stray field systems have been unable to satisfactorily resolve ID and OD defect signals.

OBJECTS AND SUMMARY OF THE INVENTION

It is, therefore, a primary object of the present invention to provide a system for the non-destructive testing of metallic workpieces such as pipes and tubes, which can simultaneously detect longitudinal and transverse defects.

A further object is to provide a tube testing system wherein ID and OD defect signals may be easily distinguished.

A still further object of the invention is to provide an improved defect testing system utilizing both leakage flux and eddy current procedures.

Another object of the invention is to provide a system as in the above objects in which punctiform sensing elements scan the workpiece reciprocatingly.

The invention may be effectively used for the testing of a workpiece of any geometry; however, the system disclosed herein is particularly adapted for the testing of elongated cylindrical members such as tubes and pipes. In accordance with the practice of this invention, a number of practically punctiform test elements, i.e., elements which are small compared to the defect size, are disposed along a generating line of the tube or pipe. A mechanical movement reciprocator or oscillator connects with each sensing element to oscillate it in a direction essentially parallel to the longitudinal axis of the tube. Relative helical motion is established between the tube and set of sensing elements whereby the tube is scanned by the elements. Adjacent pairs of sensing elements have their outputs connected in series opposition so as to compare adjacent points on he tube's surface and to produce a composite signal corresponding to the difference in the magnetic properties of such adjacent regions. In this manner a characteristic defect signal is generated which allows ID and OD defects to be easily distinguished when a stray field or leakage flux system is employed.

DESCRIPTION OF THE DRAWINGS

FIG. 5 is a cross-section taken along the line 5—5 of FIG. 3.

FIG. 6 is a plan view of one type of oscillator or reciprocator beam for use in the present invention.

FIG. 7 is a graphical representation of the radial component of the magnetic stray field produced by a defect.

FIGS. 8a and 8b are graphical representations of the radial component of the magnetic stray field of a defect and the corresponding signal voltage as a differential probe pair scans over the defect with the defect location at or near the inner surface.

DESCRIPTION OF PREFERRED EMBODIMENTS

Figure 1:
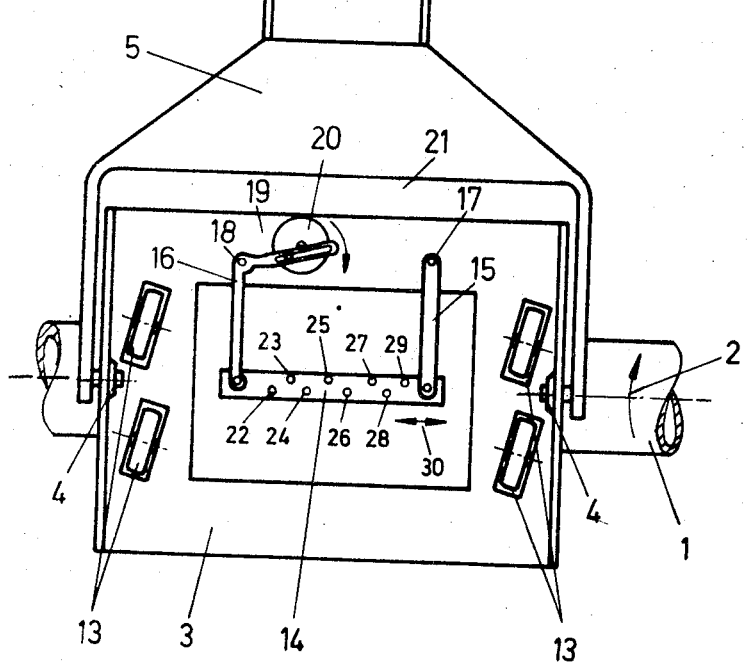
FIG. 1 is an elevational view of apparatus according to the present invention for eddy current testing.

FIG. 1 shows a system for the inspection of metallic tubes using the eddy current method according to the present invention which is especially useful for the detection of surface defects. Such surface defects are encountered, for instance, in oil well drill strings which are exposed to bending movements during drilling which produces external fatigue cracks. Accordingly, the drill strings are frequently checked for fatigue defects after each operation.

The tube 1 to be tested can be rotated by a device (not illustrated) about the axis of the tube in the direction of the arrow 2. The device for the rotation of the tube may, in the case of oil well pipes for example, consist of two double rollers, each of which is mounted in the head of a hydraulic or pneumatic lifting device, the lifting device moving the tube to be tested from a pile of such tubes into the test position. At the same time the tube is laid on the double rollers which form the heads of the respective lifting devices. The double rollers are driven by means of an attached motor and servo to rotate the tubes during testing.

Guide wheels 13 are freely mounted in the carriage 3 and contact the tube 1 during the testing operation with the wheel axes disposed at an angle to the longitudinal axis of the tube. The carriage 3 is rotatably mounted in a fork 5 as at 4, which fork 5 is positively connected to the arm 6 rotatably suspended in the bearing 7 of a frame 8 and is thereby free to rotate through a limited angle in these bearings. The frame 8 is fixedly secured to a guide 9 which slides on the shafts 10 and 11 longitudinally with respect to the tube 1. A drive (not illustrated) positions the guide 9 in the direction of arrow 12.

A reciprocator or oscillator beam 17 is pivotally suspended at its ends by a first lever 15 and a bent lever 16 which are in turn pivotally mounted at the points 17 and 18, respectively, on carriage 3. The drive arm 19 of the bent lever 16 is eccentrically related to the disc 20 which is rotated by a motor (not shown) in the direction of the arrow 21. Eight eddy current probes 22 and 29 are carried by the beam 14, arranged in two lines of four probes each, with the probes in one line being offset axially of the tube relative to the probes in the other line. The amount of the offset is the same as the distance between the two lines of probes so that four pairs of probes are formed which are adjacent each other on lines forming a 45 degree angle with the longitudinal axis of the tube.

The adjacent pairs of probes, i.e., 22 and 23, 24 and 25, 26 and 27, and 28 and 29, have their outputs connected in series opposition to each other, whereby four so-called differential probe pairs are formed.

In operation, the tube 1 rotates in the direction of the arrow 2 and the guide 9 moves over the shafts 10 and 11 in the direction of the arrow 12 and, thus, the carriage 3 moves axially along the tube 1 in the same direction. Accordingly, the oscillator beam 14, with probes 22–29 scans an essentially helical band on the surface of tube 1 while oscillating longitudingally in the direction of the arrow 30.

The oscillator may have, for example, a frequency of oscillation of 50 cycles per second and the tubes may rotate with a circumferential speed of about 150 centimeters per second. Each probe will then trace a zig-zag line on the surface of the tube, and the circumferential distance from peak to peak of this line will be approximately 3 centimeters. The distance between the adjacent probe in the direction of the oscillator movement is in the present embodiment about 60 percent of the maximum amplitude of the oscillator. In this way, the surface of the tube 1 is covered with a net of eight closely spaced and slightly overlapping zig-zag lines which results in a thorough tracing of the tube surface, assuring detection of all significant defects on the surface. Moreover, the tube is scanned in a helical band having a width equal to the width of the entire set of probes plus the oscillator amplitude. The rate of feed of guide 9 is chosen so that the carriage 3 moves a distance corresponding to just less than the width of the helical band during one revolution of the tube.

Figure 2:
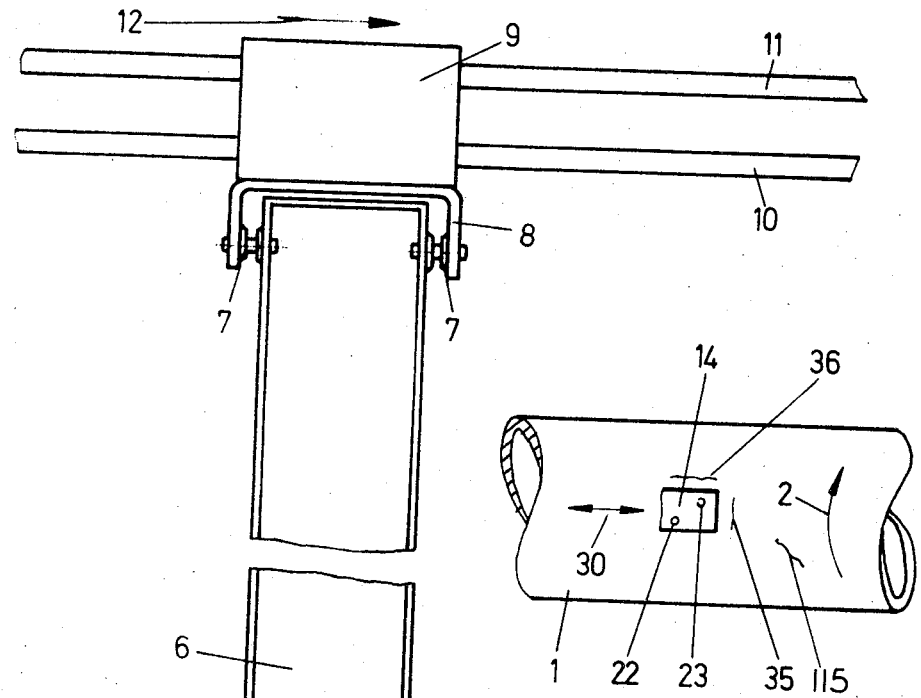
FIG. 2 is an enlarged schematic view of a tube under test showing detailed sensing by a pair of adjacent sensing elements.

If the object of the inspection were the detection of defects extending transversely of the tube length only, the differential probe pairs could be arranged in one line along a generating line of the tube 1. However, the arrangement of the probe pairs in lines which are inclined at 45° to a generating line of the tube permits a well-defined indication of defects extending in a number of possible angular directions as related to the generating line of the tube. FIG. 2 shows a transverse defect 35 and a longitudinal defeat 36 alongside the differential probe pair consisting of the single probes 22 and 23. Because the probes are oscillating in the direction of the arrow 30, first probe 23 and then probe 22 will cross the defect 35, resulting in a well defined indication of the transverse defect. Because the tube 1 is rotating about its axis in the direction 2, first probe 23 and then probe 22 will traverse the defect 36. Therefore, a well defined indication of a longitudinal defect will be provided as well.

The invention described to this point may also be employed with the magnetic leakage flux techniqes to detect defects situated other than at outer surface of the tube. In principle, an arrangement similar to that previously described could be used except that leakage flux differential probe pairs would be substituted for the eddy current probes 22-29. Additionally, provision must be made for a device to apply a magnetic field to the tube which can be fairly large, depending on the size of the tube being tested. Therefore, it is generally more expedient to provide an installation with stationary magnetizing means and fixedly mounted scanning means through which the tube is driven.

Figure 3:
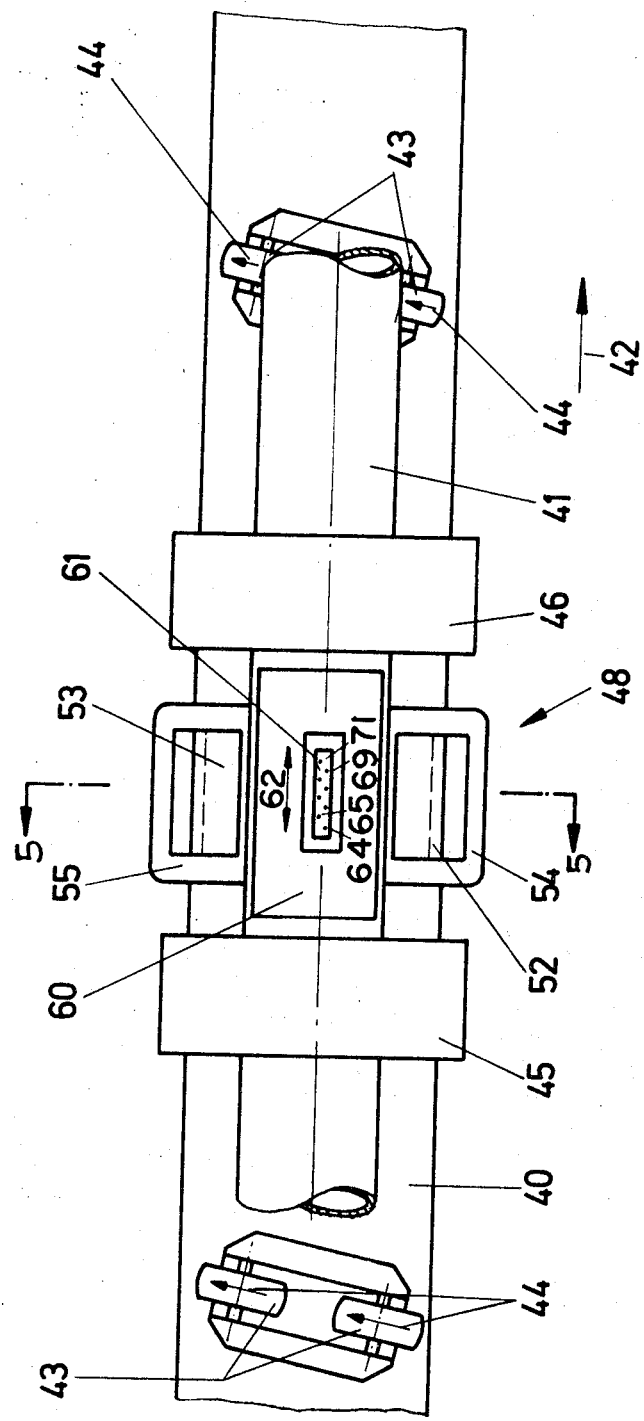
FIG. 3 is an elevational view of apparatus according to the invention for leakage flux testing.

Such an installation is illustrated in FIGS. 3 and 5, in which a live roller bed 40 is traversed by a tube 41 to be tested in the direction of the arrow 42. The tube 41 rests on rollers 43 driven by a motor (not shown) in the direction of the arrows 44. The axes of the rollers are slightly inclined relaive to the axis of the tube, so that the tube undergoes not only rotation, but an axial movement as well, i.e., experiences a resultant forward helical motion in the direction of the arrow 42. The pitch of the helix depends on the inclination of the rollers 43 and is preferably adjustable.

Figure 4:
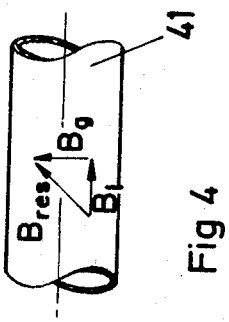
FIG. 4 shows a detailed schematic view of the tube of FIG. 3, showing the arrangement of the various magnetic field vectors.

Two magnetizing coils 45 and 46 coaxially mount the tube 41 and produce a magnetic field $B_1$ in the tube between the coils, extending along the direction of the axis of the tube 41 as shown in FIG. 4. A magnetizing yoke 48, shown in cross-section in FIG. 5, provides a transverse magnetic field. The yoke includes a core 51, two extension pole pieces 52 and 53 and exciter coils 54 and 55. When a direct current is passed through the coils 54 and 55, the yoke produces a transverse magnetic field between the pole pieces and in the wall of the tube being tested. In FIG. 4, this magnetic field is represented by the vector $B_g$. In the region of the workpiece halfway between the pole pieces 52 and 53 and halfway between the magnetizing coils 45 and 46, the two magnetic fields $B_1$ and $B_g$ will produce the resultant field $B_{res}$. Preferably, the vectors $B_1$ and $B_g$ are equal in magnitude so that the resultant magnetic field is inclined at an angle of 45° to the tube axis.

A mechanical reciprocator or oscillator arrangement 60, having an oscillator beam 61, is provided which operates substantially identically to that shown in FIG. 1. The oscillator is mounted above the tube 41 halfway between the two magnetizing coils 45 and 46 and midway between the pole pieces 52 and 53. For reasons of simplicity, the oscillator drive has not been illustrated and may be the same as for the first described embodiment and produces a reciprocating movement in the direction of the arrow 62. Four differential probe pairs sensitive to leakage flux and with the line between the probes of each pair inclined at an angle of 45° to a generating line of the tube 41 are mounted on the oscillator beam 61. The probes are so oriented that only the radial component of the leakage flux, i.e., the field component normal to the surface of the tube, will be sensed. The advantages of this arrangement will be more fully described below.

In operation of the system, the tube 41 is driven by the rollers 43 and moves helically through the coils 45 and 46 and the yoke 48 and below the oscillator means 60. Owing to the vectorial addition of the two fields produced by the magnetizing device, a magnetic field $B_{res}$ is created at the point in the workpiece under the oscillator 60, the direction of said field being inclined at 45° to the longitudinal axis of the tube, which field orientation causes transverse and longitudinal defects to produce equal stray fields. Accordingly, transverse and longitudinal defects can be detected with equal sensitivity.

While the tube is moved forward helically, the oscillator beam carrying the field sensitive elements 64–71 traces a ribbon or band on the surface of the tube as previously described, the width of the ribbon corresponding to the width of the set of probes plus the oscillator amplitude.

FIG. 6 shows a further embodiment of the oscillator beam 61 in plan view, which is particularly advantageous for use in a leakage flux testing system. The characteristic feature of this embodiment is that the distance between the single probes in a differential pair can be adjusted while maintaining the angle of the line between them at 45° to the tube axis. In addition, this angle may be changed to 135° to the tube axis, and the distance between the two single probes adjusted at this angle, as well. To this end, the probes 64, 66, 68 and 70 are fixedly mounted to the probe beam 61. The probes 65, 67, 69 and 71 are mounted on an adjustable comb 72, which is positioned in a recess 73 of the beam 61 disposing these probes all at the same distance from the surface of the tube being tested. Two continuous guide grooves 74, one at each end of the comb 72, are formed in the comb. One part of each groove is inclined at an angle of 45 degrees to the tube axis while a second portion is inclined at an angle of 135° to the same axis, with the inclined parts connected by a straight portion running parallel to the tube axis. A knurled cap screw 75 passes through each groove 74 and is threaded into the oscillator beam 61 to guide the comb 72 via the guide groove 74 and to fix the position of the comb after the desired distance and angle have been selected.

An explanation of the particular advantages of this type of oscillator bar requires a brief explanation of the character of the magnetic stray field produced by a defect. As previously explained, the magnetic leakage flux probes are aligned so that only the radial component of a stray field is sensed. With reference now to FIG. 7, in a section of the tube wall 81 there is a defect 82 at a distance T below the outer surface. The path of a probe is indicated by the dashed line 83 at a distance $h$ above the surface. A graph of the magnitude of the radial component of the stray field produced by the defect is superimposed on this line, with the line 83 representing the zero level, and shows that it varies from the zero level 83 to a positive maximum 83a, back to zero at 83b, to a negative minimum value 83c and back to the zero level 83. The maximum 83a and the minimum 83c are spatially located at a distance $d$ from each other.

It can be shown that the distance $d$ between the maximum and minimum equals the sum of the depth T and the distance $h$, i.e., $d = h + T$. Therefore, in the case of an ID defect the distance $d$ is large, whereas in the case of an OD defect the the distance $d$ is relatively small. This fact may be used to differentiate between the signals from ID to OD defects. Also, the distance between the single probes in a differential probe pair may be adjusted to correspond to the distance $d$ between the maximum and minimum of a defect as a certain depth for a purpose that will be more fully explained below.

FIG. 8a depicts a plot 91 of the radial component of the leakage flux caused by a defect substantially below the tube surface. The two probes 92 and 93 of a differential pair are adjustably located at a distance $d$ from each other, which is equal to the distance between the maximum and minimum of the radial component of the leakage flux produced by the defect. If the defect is on the inside surface of the tube, this distanc $d$ is equal to the thickness of the wall plus the height of the probes above the tube surface. The point 94 represents the midpoint of the line joining the two probes. The probe 92 is the positively acting probe of the differential pair, i.e., it will generate a positive signal when the radial component of the leakage flux is positive, whereas the probe 93 is the negatively acting probe of the pair and it will generate a negative signal when the radial component of the leakage flux is positive. The two signals, it will be remembered, are added together in opposition, so that if each of the probes of a differential pair senses an equal field, the net output from the pair will be zero.

FIGS. 8b represents a plot 95 of the output voltage $U_d$ from the differential pair 92, 93. The abscissa on the graph represents the position of the probe pair centerpoint 94 on the surface, while the ordinate represents the output voltage. It will be seen that the output voltage as the probe pair scans over the defect varies from zero to a negative value in the range 96, zero, a maximum 95, back to zero in the range 97, again from zero to a minimum 98 and back to zero. The maximum 95 corresponds to the probe position shown in the upper part of FIG. 8.

Figure 9A:
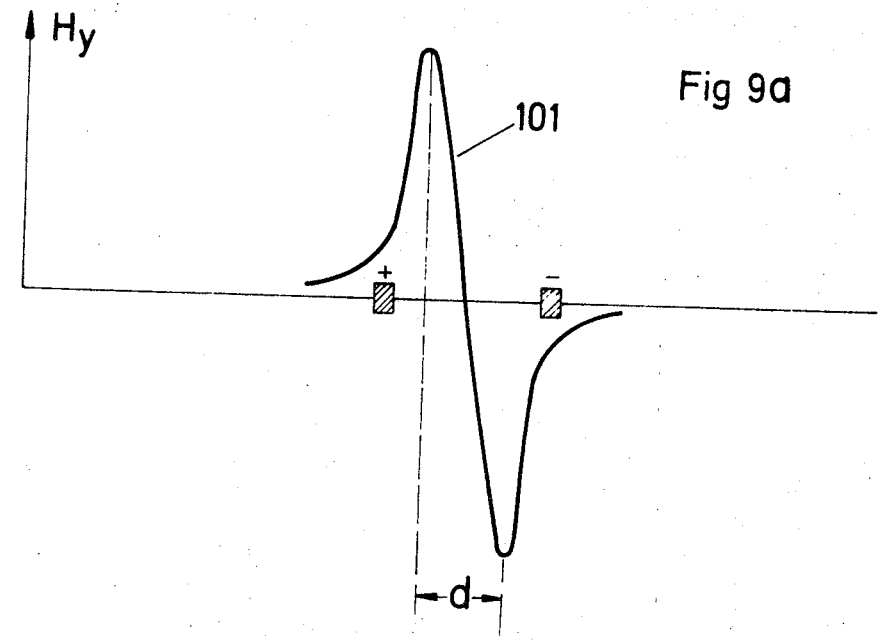
FIGS. 9a and 9b are similar to FIGS. 8a and 8b except that the defect is at or near the outer surface.
Figure 9B:
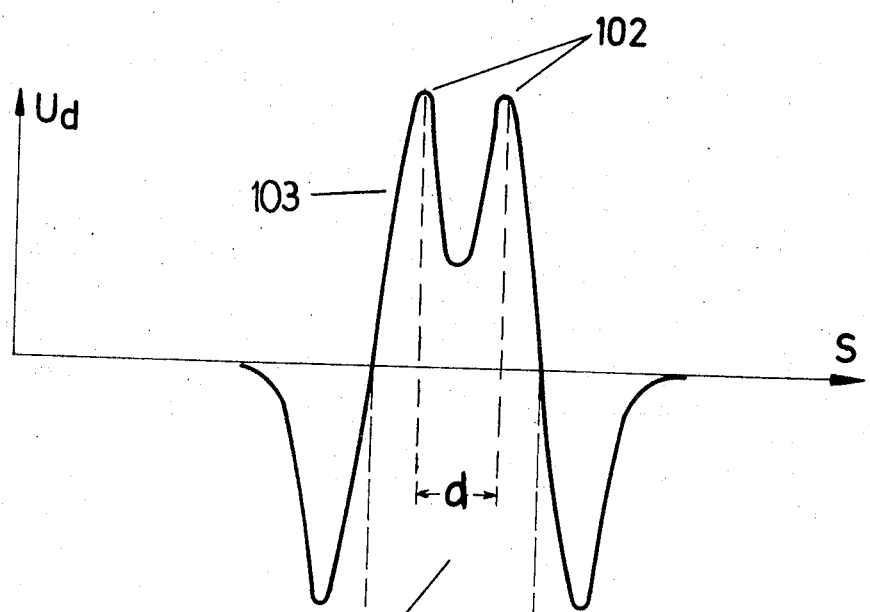

In analogous fasion, FIGS. 9a and 9b illustrates a plot 101 of the radial component of the leakage flux and a plot 103 of the output voltage caused by a defect near the surface. FIG. 9a shows the magnitude of the radial component of the stray field while FIG. 9b shows the output voltage from the differential probe pair 92, 93. The probe spacing is the same as in FIG. 8, but the distance between the maximum and minimum of the radial component d, is considerably smaller, which results in the radically different curve of the form shown in FIG. 9b. This curve 103 shows two maxima 102 in the range 97', whereas the curve in FIG. 8b has but one. In addition, the signal from an ID defect as in FIG. 8b has a maximum 95 which is approximately twice as high as the signal generated in a single probe 92 or 93. This is due to the fact that when the probe pair center 94 is directly over the defect, the positively acting probe 92 is located at the maximum of the radial component of the stray field and the negatively acting probe 93 is located at the minimum of the radial component of the stray field. The negatively acting probe 93, on sensing a negative field, produces a positive signal when is added to the positive signal from the probe 92 to give a higher maximum at 95. In contrast, when the probe pair are centered over a surface defect, the probes are displaced from the maximum positions for a single probe and therefore the recorded maxima 102 in FIG. 9b are only slightly greater than the signal that would be obtained from a single probe. The two signals are also different in that the curve 103 shown in FIG. 9b has a much greater percentage of high frequency components than the curve 95 of FIG. 8b.

The two effects just discussed allow a much finer distinction of ID from OD defects, and a much more sensitive detection of ID defects than has heretofore been possible. In the first place, the preferred mutual spacing of the probes of the differential pair enhances the signal arising from an ID defect as described above, but does not increase the signal from an OD defect. This is exactly what is desired, for the signal from an ID defect has in past systems always been much weaker than an OD defect signal. To overcome this disparity in signal magnitudes, previous known leakage flux systems have resorted to complex amplification systems to enhance the signals originating from ID defects, whereas the present invention obtains improved results with considerable simplification of the electronics and consequent reduction in cost.

A further advantage results from the fact that the described probe spacing produces a large difference in the frequency spectra of ID and OD defects. It has been known to separate ID and OD signals on the basis of their different frequency spectra, but the frequency difference in prior systems has been rather small. For example, certain previous systems have relied solely on the fact that the leakage flux from an OD defect presents a steeper gradient than the flux from an ID defect, and when such a flux is scanned by a moving probe, the frequency of an OD defect signal is slightly higher than that from an ID defect. However, the differential probe pair arrangement of the present invention produces an OD signal having a relatively high frequency component and which, in fact, is approximately twice the frequency of an ID defect signal. It can be seen by comparing the output signals in FIGS. 8b and 9b, that the ID defect signal passes through approximately 1½ cycles while the OD defect signal passes through 2½ cycles in the same time period.

Referring again to FIG. 6, the adjustable comb 72 allows the distance between the individual probes in the differential pairs to be adjusted to correspond to the distance between the maximum and minimum of the radial component of a stray field produced by an ID defect. And, as already noted, this is equal to the wall thickness plug the distance of the probes from the surface. This allows maximum enhancement of an ID defect signal and maximum separation of the frequency spectra of ID and OD defect signals. Also, with the probe pairs inclined at 45° to the tube axis as previously described, they will react to both longitudinal transverse cracks or defects.

Still further, the probe pairs will respond to spiral (inclined) defects as long as they are perpendicular to the direction of the magnetic flux in the workpiece and to the line joining the probes of the differential pair, i.e., as long as they are oriented as the crack 115 shown in FIG. 2. With such a crack, a leakage flux component is created over the defect and the individual probes 22 and 23 pass over the defect at different times, as is necessary for a good differential indication of the defect. Spiral defects which runs in the same direction as the magnetic flux and the connecting line between the single probes will be missed. However, spiral inclined cracks are encountered only rarely, and it is usually the case that when found they will run in a preferred helicoidal direction dependent on the manufacturing procedure.

The oscillator bar 61 with the adjustable come 72 allows the system to be adapted to detect spiral or select inclined defects. As previously described, the line between the single probes of the differential pairs can be adjusted to 45° or 135° relative to the tube axis by loosening the cap screws 75 and shifting the comb 72 until the cap screws ride in the desired inclined portions of the guide groove 74. The cap screws are then re-tightened. Of course, the direction of the magnetic flux in the tube wall must be rotated 90°, and this is accomplished simply by reversing the current to either the longitudinal field coils 45 and 46 or to the yoke coils 54 and 55.

Figure 10:
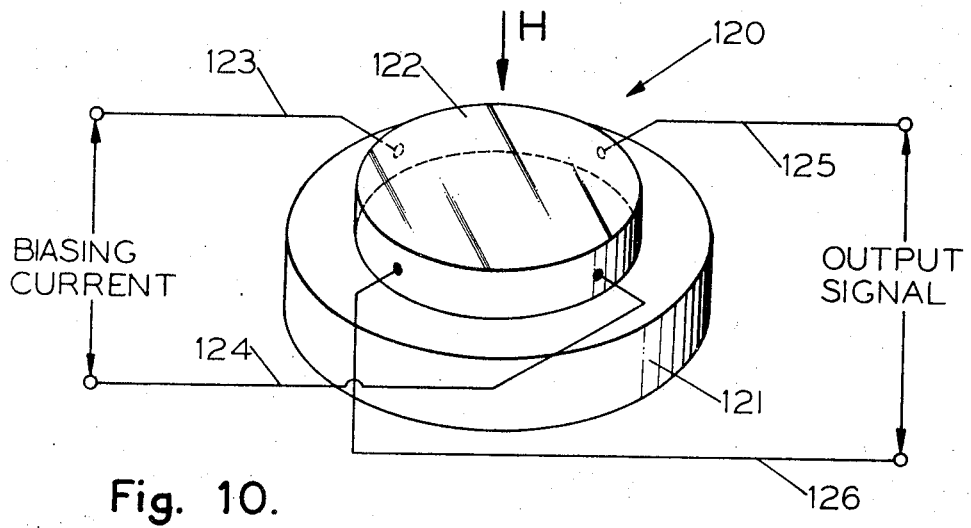
FIG. 10 depicts one form of magnetic sensor for use with this invention.

Although a number of different probes constructions may be used in the present invention, best results to date have been obtained by the use of devices operating on the so-called Hall effect principle. With reference now particularly to FIG. 10, a Hall effect device 120 is seen to include a disclike insulative substrate 121 on which is mounted a relatively thin disc 122, which is a special semiconductor crystal. A first pair of leads 123 and 124 connected to opposite sides of the disc 122 provide energizing current from a direct current source, and a second pair of leads 125 and 126 connected to opposite sides of the disc 122 and at 90° to the connection for 123, 124 serves as a signal output means. When the device is provided with energizing current via leads 123, 124, magnetic flux (H) directed at 90° to a major surface of the disc 122 causes a voltage signal to occur across leads 125, 126.

Figure 11:
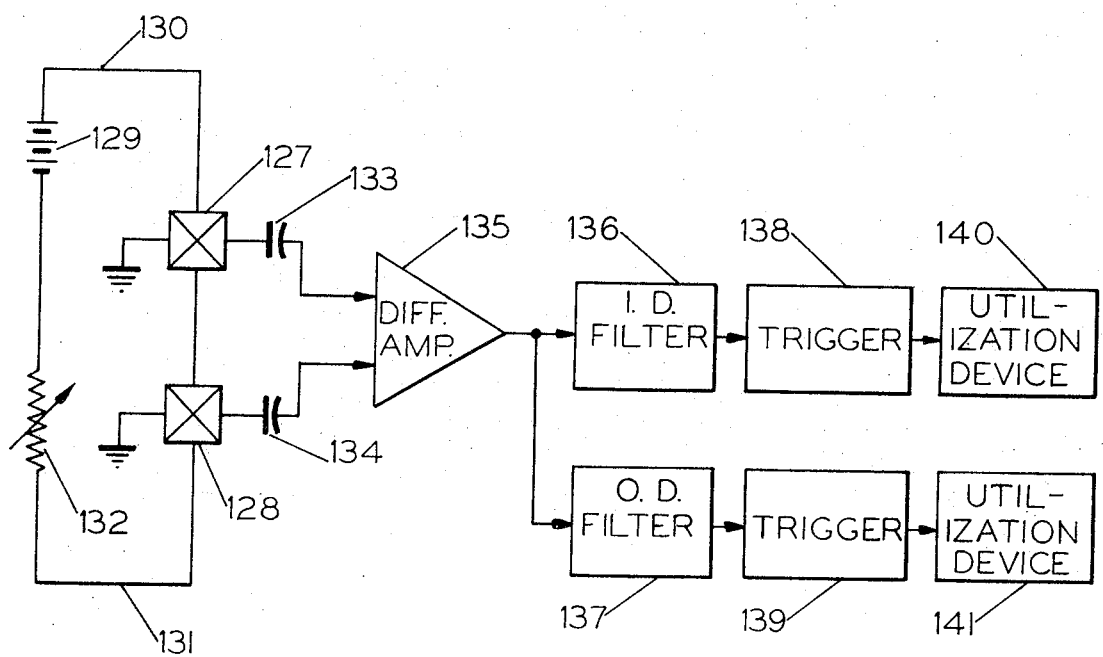
FIG. 11 illustrates a circuit schematic for identifying the type of defects detected by the present invention.

Reference is now made to FIG. 11 depicting the circuit schematic for a pair of probes 127 and 128 forming a differential pair, with it being understood that other differential probe pairs of the described apparatus may be connected in the same manner. The probes are provided with direct current energization from a battery source 129, for example, via leads 130 and 131, the value of which may be selectively adjusted by the variable resistor 132. The signal lead from the probe 127 and the oppositely poled signal lead of probe 128 are connected through capacitors 133 and 134, respectively, to the input of a differential amplifier 135. The amplifier output is filtered via filters 136 (ID) and 137 (OD) which are appropriately designed to pass signals having frequency characteristics of ID and OD defect signals, respectively. Triggers 138 and 139 are actuated by the corresponding filtered outputs of the filters 136 and 137 to, in turn, energize either the ID or OD utilization apparatus 140 and 141. The utilization apparatus can take any number of different forms, such as, for example, devices for spraying a band or spot on the workpiece of a color coded to identify the type of defect, means for conveying defective tubing along a different path from that of tubing with no defects, or the like.

What is claimed is:

1. Apparatus for detecting defects in the walls of metal tubing, comprising:
   means for generating a magnetic field within the body of said tubing whereby a stray field is produced lying radially outwardly of said tubing adjacent defects in said tubing;
   a plurality of paired sets of magnetic field sensing devices arranged in spaced relation to the outer surface of said tubing, the devices of each pair being electrically connected in opposition and positioned relative to each other and the test pieces such that a straight line connecting the devices of each pair would be oriented at an acute angle with respect to the tubing longitudinal axis;
   means for adjusting the spacing between paired sets of devices;
   means for producing relative helicoidal movement between the tubing and the sensing devices; and
   means for reciprocating the field sensing devices generally longitudinally of the tubing during relative movement.

2. Apparatus as in claim 1, in which the devices of each pair are separated from one another at a distance substantially equal to the sum of the tubing wall thickness and the spacing of the devices from the outer tubing wall.

3. Apparatus as in claim 1, in which the pairs of devices are arranged in paired sets extending consecutively along a line parallel to the tube axis and with the line between devices of each pair being oriented angularly with respect to the tubing axis at a common angle of substantially 45°; and the means for reciprocating connected to move all of the sensing devices as a single unit.

4. Apparatus as in claim 1, in which the devices of each paried set are arranged in mutually spaced relation, and the field sensing devices are reciprocated longitudinally of the tubing an amount bearing a significant ratio to the spacing of the paired devices from each other.

5. Apparatus for the nondestructive testing of metal tubes to locate longitudinal and transverse defects, comprising:
   means for moving a tube to be tested along a helicoidal path;
   a carriage mounted upon the outer surface of said tube;
   reciprocating means mounted on said carriage;
   at least one pair of mutually spaced magnetic field sensing elements carried by the reciprocating means and disposed in slightly spaced relation to the outer surface of said tube, means for adjusting and spacing between said elements, said elements being arranged in a line extending generally at 45° to the tube axis, and said elements being connected in electrical opposition to form a differential pair whereby the signal obtained from the pair of elements corresponds to the difference in the defect characteristics of the two regions being sensed by the elements; and
   electric circuit means connected to receive signals from said sensing elements and including a first channel responsive to the frequency characteristic of a tube outer surface defect and a second channel responsive to the requency characteristics of signals caused by defects other than on the tube outer surface.

6. Apparatus as in claim 5, in which means are provided on said carriage for selectively changing the arrangement of said elements from 45° to 135°.

7. Apparatus as in claim 5, in which the sensing elements are spaced from each other a distance equal substantially to the sum of the tube wall thickness and the spacing of the elements from the outer surface of the tube.

8. Apparatus for the nondestructive testing of metal tubes to locate longitudinal and transverse defects, comprising:
   means for moving a tube to be tested along a helicoidal path;
   a carriage mounted upon the outer surface of said tube;
   reciprocating means mounted on said carriage;
   at least one pair of mutually spaced magnetic field sensing elements carried by the reciprocating means and disposed in slightly spaced relation to the outer surface of said tube, means for adjusting the spacing between said elements, said elements being arranged in a line extending generally at 45° to the tube axis, and said elements being connected in electrical opposition to form a differential pair whereby the signal obtained from the pair of elements corresponds to the difference in the defect characteristics of the two regions being sensed by the elements; and
   electric circuit means connected to receive signals from said sensing elements.

* * * * *